US012771149B2

(12) United States Patent
Kanda

(10) Patent No.: US 12,771,149 B2
(45) Date of Patent: Oct. 20, 2026

(54) POWER SYSTEM, POWER CONTROL DEVICE, AND POWER CONTROL METHOD

(71) Applicant: TOYOTA JIDOSHA KABUSHIKI KAISHA, Toyota (JP)

(72) Inventor: Chiaki Kanda, Kariya-city (JP)

(73) Assignees: TOYOTA JIDOSHA KABUSHIKI KAISHA, Toyota (JP); DENSO CORPORATION, Kariya-city (JP)

( * ) Notice: Subject to any disclaimer, the term of this patent is extended or adjusted under 35 U.S.C. 154(b) by 932 days.

(21) Appl. No.: 18/163,380

(22) Filed: Feb. 2, 2023

(65) Prior Publication Data

US 2023/0322113 A1 Oct. 12, 2023

(30) Foreign Application Priority Data

Apr. 8, 2022 (JP) ................................ 2022-064608

(51) Int. Cl.

| | |
|---|---|
| ***H02J 7/50*** | (2026.01) |
| ***B60L 53/60*** | (2019.01) |
| ***B60L 53/63*** | (2019.01) |
| ***B60L 53/67*** | (2019.01) |
| ***B60L 53/68*** | (2019.01) |
| ***B60L 55/00*** | (2019.01) |

(52) U.S. Cl.

CPC ................ *H02J 7/50* (2026.01); *B60L 53/60* (2019.02); *B60L 53/63* (2019.02); *B60L 53/67* (2019.02); *B60L 53/68* (2019.02); *B60L 55/00* (2019.02); *Y02T 10/70* (2013.01); *Y02T 10/7072* (2013.01); *Y02T 90/12* (2013.01)

(58) Field of Classification Search

CPC .......... B60L 53/60; B60L 53/63; B60L 53/67; B60L 53/68; B60L 55/00; H02J 7/0013; Y02T 10/70; Y02T 10/7072; Y02T 90/12

See application file for complete search history.

(56) References Cited

U.S. PATENT DOCUMENTS

2012/0098488 A1* 4/2012 Ichikawa ............... B60L 53/14 320/109
2019/0190703 A1* 6/2019 Lekkas ................ H04L 9/0825
(Continued)

FOREIGN PATENT DOCUMENTS

GB 2578369 A 5/2020
JP 2010-187453 A 8/2010
(Continued)

*Primary Examiner* — Julian D Huffman
*Assistant Examiner* — Johali A Torres Ruiz
(74) *Attorney, Agent, or Firm* — Finnegan, Henderson, Farabow, Garrett and Dunner, LLP

(57) ABSTRACT

A power system includes a first power device, a second power device, a third power device, and a power control device. The power control device is configured to control power control of each of the first power device, the second power device, and the third power device. The power control device is configured to perform gradual change switching control when the power control device switches a target of the power control from the first power device to the second power device. The power control device is configured to perform instant switching control when the power control device switches the target of the power control from at least one of the first power device and the second power device to the third power device.

7 Claims, 10 Drawing Sheets

| VEHICLE | MAXIMUM COMMUNICATION DELAY PERIOD |
|---|---|
| VEHICLE 50A | 0.5 MINUTES (ΔTa) |
| VEHICLE 50B | 1 MINUTE (ΔTb) |
| VEHICLE 50C | 1.5 MINUTES |
| VEHICLE 50D | 0.5 MINUTES (ΔTd) |
| VEHICLE 50E | 1 MINUTE |

(56) References Cited

U.S. PATENT DOCUMENTS

| | | | | |
|---|---|---|---|---|
| 2021/0001742 | A1* | 1/2021 | Choi | B60L 53/30 |
| 2021/0053459 | A1 | 2/2021 | Tsuchiya et al. | |
| 2021/0107373 | A1* | 4/2021 | Nakamura | B60L 53/14 |
| 2021/0252991 | A1* | 8/2021 | Pizzurro | B60L 53/11 |
| 2021/0276446 | A1* | 9/2021 | Logvinov | B60L 53/14 |
| 2021/0325468 | A1* | 10/2021 | Kataoka | G01R 31/367 |
| 2022/0089055 | A1* | 3/2022 | TenHouten | B60L 53/62 |
| 2023/0143398 | A1* | 5/2023 | Ito | B60L 53/53 320/109 |
| 2023/0256860 | A1* | 8/2023 | Marcos Moreira Da Silva | B60L 53/68 307/9.1 |

FOREIGN PATENT DOCUMENTS

| | | | |
|---|---|---|---|
| JP | 2020-068585 | A | 4/2020 |
| JP | 2021-035135 | A | 3/2021 |

* cited by examiner

FIG. 6

| VEHICLE | MAXIMUM COMMUNICATION DELAY PERIOD |
| --- | --- |
| VEHICLE 50A | 0.5 MINUTES (ΔTa) |
| VEHICLE 50B | 1 MINUTE (ΔTb) |
| VEHICLE 50C | 1.5 MINUTES |
| VEHICLE 50D | 0.5 MINUTES (ΔTd) |
| VEHICLE 50E | 1 MINUTE |

POWER SYSTEM, POWER CONTROL DEVICE, AND POWER CONTROL METHOD

CROSS-REFERENCE TO RELATED APPLICATION

This application claims priority to Japanese Patent Application No. 2022-064608 filed on Apr. 8, 2022, incorporated herein by reference in its entirety.

BACKGROUND

1. Technical Field

The present disclosure relates to a power system, a power control device, and a power control method.

2. Description of Related Art

Japanese Unexamined Patent Application Publication No. 2021-035135 (JP 2021-035135 A) discloses a power system including a first vehicle, a second vehicle, and an external power supply. The first vehicle and the second vehicle are externally charged by being supplied with electric power from the external power supply. Specifically, the target of the external charging is switched from the first vehicle to the second vehicle by a relay method. At this time, the charging power of the first vehicle and the charging power of the second vehicle are gradually changed. While the charging power of each vehicle is gradually changed, the sum of the charging powers of the external charging is kept constant.

SUMMARY

In JP 2021-035135 A, when the external charging is switched from the first vehicle to the second vehicle by the relay method, the charging power of the first vehicle and the charging power of the second vehicle are gradually changed as described above. In JP 2021-035135 A, however, no consideration is made on a case where the first vehicle is unexpectedly withdrawn from the external charging before the scheduled time. In this case, it may be difficult to compensate for a fluctuation in the sum of the charging powers caused by the unexpected withdrawal of the first vehicle from the external charging, with the charging power of the second vehicle. For this reason, the amount of the fluctuation in the sum of the charging powers of the external charging may increase. Therefore, there is a demand for a power system, a power control device, and a power control method capable of suppressing the fluctuation in the sum of the electric powers in the external charging when a plurality of vehicles performs the external charging (power control).

The present disclosure provides a power system, a power control device, and a power control method capable of suppressing a fluctuation in the sum of electric powers in external charging (power control) when a plurality of vehicles performs the power control.

A power system according to a first aspect of the present disclosure includes a first power device, at least one second power device, at least one third power device, and a power control device. The first power device is configured to be set to perform power control including at least one of power feeding to a power grid and charging from the power grid during a first period. The second power device is configured to be set to perform the power control during a second period after the first period. The third power device is configured to be set to perform the power control when at least one of the first power device and the second power device is withdrawn from the power control during the power control. The power control device is configured to control the power control of the first power device, the power control of the second power device, and the power control of the third power device. The power control device is configured to perform gradual change switching control when the power control device switches a target of the power control from the first power device to the second power device. The gradual change switching control is control for switching the target of the power control by gradually changing both charging amounts or power feeding amounts in the power control of the first power device and charging amounts or power feeding amounts in the power control of the second power device. The power control device is configured to perform instant switching control when the power control device switches the target of the power control from the at least one of the first power device and the second power device to the third power device. The instant switching control is control for switching the target of the power control by instantly changing a charging amount or a power feeding amount in the power control of the third power device to an amount corresponding to at least one of the charging amount or the power feeding amount in the power control of the first power device and the charging amount or the power feeding amount in the power control of the second power device.

In the power system according to the first aspect of the present disclosure, the power control device switches the target of the power control from the first power device to the second power device by performing the gradual change switching control as described above. Further, the power control device switches the target of the power control from the at least one of the first power device and the second power device to the third power device by performing the instant switching control. Therefore, even when the at least one of the first power device and the second power device is unexpectedly withdrawn from the power control during the power control, the power control device instantly changes the electric power of the third power device. Thus, it is possible to promptly compensate for an unexpected fluctuation in the sum of the electric powers in the power control caused by the unexpected withdrawal of the at least one of the devices. As a result, the fluctuation in the sum of the electric powers in the power control can be suppressed.

There may be a difference between a communication delay period between the first power device and the power control device and a communication delay period between the second power device and the power control device due to a difference in the communication environment or the like. Therefore, when the target of the power control is switched by instantly changing the electric power of each of the first power device and the second power device, the sum of the electric powers in the power control may abruptly fluctuate due to the difference in the communication delay period. In view of this, the gradual change switching control is performed when the target of the power control is switched between the first power device and the second power device. Thus, the sum of the electric powers in the power control can be changed gradually. As a result, the fluctuation in the sum of the electric powers in the power control can further be suppressed even in the event of the communication delay compared to the case where the electric power of each of the first power device and the second power device is instantly changed.

In the power system according to the first aspect of the present disclosure, the power control device may be configured to communicate with the first power device, communicate with the second power device, communicate with the third power device, acquire information on a first communication delay period in communication between the first power device and the power control device, acquire information on a second communication delay period in communication between the second power device and the power control device, acquire information on a third communication delay period in communication between the third power device and the power control device, perform the gradual change switching control based on the first communication delay period and the second communication delay period, and perform the instant switching control based on the third communication delay period. With this configuration, the power control device can perform the gradual change switching control based on the difference between the communication delay period of the first power device and the communication delay period of the second power device. As a result, when the target of the power control is switched from the first power device to the second power device, it is possible to easily adjust the length of the period of fluctuation of only one of the first power device and the second power device. Further, the power control device can perform the instant switching control based on the communication delay period of the third power device. As a result, when the target of the power control is switched from the at least one of the first power device and the second power device to the third power device, it is possible to easily adjust the length of the period in which neither the at least one of the first power device and the second power device nor the third power device is performing the power control.

The power system according to the first aspect of the present disclosure may further include a plurality of the second power devices and a plurality of the third power devices. The power control device may be configured to select, from among the second power devices, the second power device including a smallest difference between the second communication delay period and the first communication delay period as a target of the gradual change switching control, and select, from among the third power devices, the third power device including the shortest third communication delay period as a target of the instant switching control. With this configuration, when the target of the power control is switched from the first power device to the second power device, it is possible to minimize the length of the period of fluctuation of only one of the first power device and the second power device. When the target of the power control is switched from the at least one of the first power device and the second power device to the third power device, it is possible to minimize the length of the period in which neither the at least one of the first power device and the second power device nor the third power device is performing the power control.

In the power system according to the first aspect of the present disclosure, the first period may include a predetermined time earlier by a predetermined period than a scheduled end time of the first period. The power control device may be configured to determine to perform the gradual change switching control when the power control of the first power device is being performed until the predetermined time. The power control device may be configured to determine to perform the instant switching control when the first power device is withdrawn from the power control before the predetermined time. With this configuration, the power control device can determine which of the gradual change switching control and the instant switching control is to be performed in advance of the scheduled end time of the first period.

In the power system according to the first aspect of the present disclosure, the power control device may be configured to communicate with the first power device, communicate with the second power device, communicate with the third power device, acquire information on a first communication delay period in communication between the first power device and the power control device, acquire information on a second communication delay period in communication between the second power device and the power control device, and acquire information on a third communication delay period in communication between the third power device and the power control device. The predetermined period may have a length equal to or larger than a length of a longer one of the first communication delay period and the second communication delay period. With this configuration, it is possible to suppress the end of the first period before the device having the longer communication delay period, among the first power device or the second power device, starts the power control. As a result, the period in which the electric power in the power control of the first power device is gradually changed and the period in which the electric power in the power control of the second power device is gradually changed can overlap each other more securely.

In the power system according to the first aspect of the present disclosure, the first power device may include an electrified vehicle. Unlike a power storage device or the like, the electrified vehicle is movable. Since the first power device (electrified vehicle) is movable during the power control in the first period, there is a relatively strong possibility of withdrawal from the power control during the power control. Therefore, the fluctuation in the sum of the electric powers in the power control can be suppressed more effectively when the instant switching control can be performed between the first power device and the third power device.

In the power system according to the first aspect of the present disclosure, the second power device may include an electrified vehicle. With this configuration, similarly to the above, the fluctuation in the sum of the electric powers in the power control can be suppressed more effectively when the instant switching control can be performed between the second power device and the third power device.

A power control device according to a second aspect of the present disclosure includes a processor. The processor is configured to perform power control of a first power device. The power control includes at least one of power feeding to a power grid and charging from the power grid. The first power device is configured to be set to perform the power control during a first period. The processor is configured to perform the power control of a second power device. The second power device is configured to be set to perform the power control during a second period after the first period. The processor is configured to perform the power control of a third power device. The third power device is configured to be set to perform the power control when at least one of the first power device and the second power device is withdrawn from the power control during the power control. The processor is configured to perform gradual change switching control when the processor switches a target of the power control from the first power device to the second power device. The gradual change switching control is control for switching the target of the power control by gradually changing both charging amounts or power feeding amounts in the power control of the first power device and charging amounts or power feeding amounts in the power control of the second power device. The processor is configured to perform instant switching control when the processor switches the target of the power control from the at least one of the first power device and the second power device to the third power device. The instant switching control is control for switching the target of the power control by instantly changing a charging amount or a power feeding amount in the power control of the third power device to an amount corresponding to at least one of the charging amount or the power feeding amount in the power control of the first power device and the charging amount or the power feeding amount in the power control of the second power device.

In the power control device according to the second aspect of the present disclosure, the processor switches the target of the power control from the first power device to the second power device by performing the gradual change switching control as described above. Further, the processor switches the target of the power control from the first power device to the third power device by performing the instant switching control. Therefore, even when the at least one of the first power device and the second power device is unexpectedly withdrawn from the power control during the power control, the processor instantly changes the electric power of the third power device. Thus, it is possible to promptly compensate for an unexpected fluctuation in the sum of the electric powers in the power control caused by the unexpected withdrawal of the at least one of the devices. As a result, it is possible to provide a power control device capable of suppressing the fluctuation in the sum of the electric powers in the power control.

A power control method according to a third aspect of the present disclosure includes performing power control of a first power device, performing the power control of a second power device, and performing the power control of a third power device. The power control includes at least one of power feeding to a power grid and charging from the power grid. The first power device is configured to be set to perform the power control during a first period. The second power device is configured to be set to perform the power control during a second period after the first period. The third power device is configured to be set to perform the power control when at least one of the first power device and the second power device is withdrawn from the power control during the power control. The power control method includes switching a target of the power control from the first power device to the second power device by gradually changing both charging amounts or power feeding amounts in the power control of the first power device and charging amounts or power feeding amounts in the power control of the second power device, and switching the target of the power control from the at least one of the first power device and the second power device to the third power device by instantly changing a charging amount or a power feeding amount in the power control of the third power device to an amount corresponding to at least one of the charging amount or the power feeding amount in the power control of the first power device and the charging amount or the power feeding amount in the power control of the second power device.

In the power control method according to the third aspect of the present disclosure, as described above, the target of the power control is switched from the first power device to the second power device, and is switched from the first power device to the third power device. Therefore, even when the at least one of the first power device and the second power device is unexpectedly withdrawn from the power control during the power control, the electric power of the third power device is instantly changed. Thus, it is possible to promptly compensate for an unexpected fluctuation in the sum of the electric powers in the power control caused by the unexpected withdrawal of the at least one of the devices. As a result, it is possible to provide a power control method capable of suppressing the fluctuation in the sum of the electric powers in the power control.

With the present disclosure, it is possible to suppress the fluctuation in the sum of the electric powers in the power control when a plurality of vehicles performs the power control.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a diagram showing maximum communication delay periods between the server and the vehicles according to the embodiment;

DETAILED DESCRIPTION OF EMBODIMENTS

Figure 1:
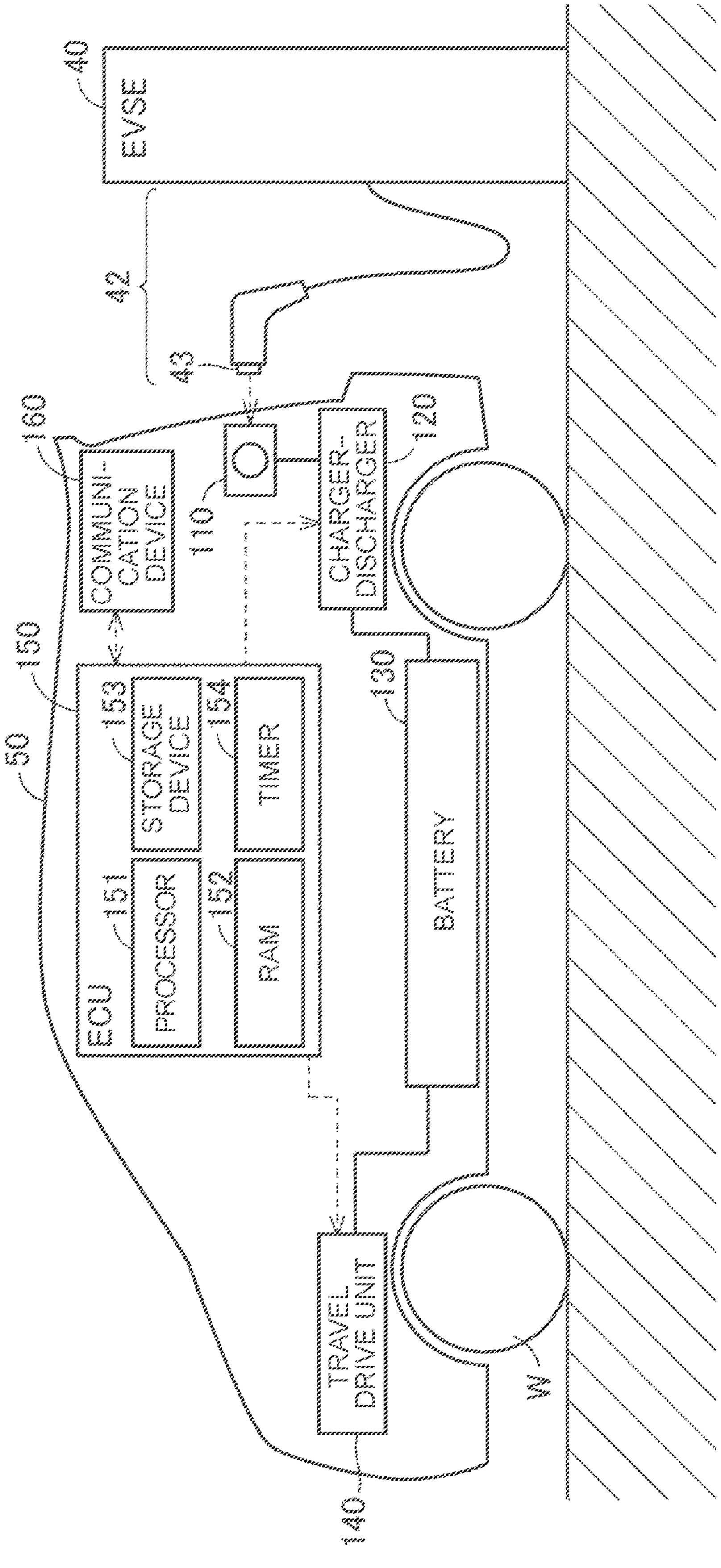
FIG. 1 is a diagram showing a detailed configuration of a vehicle according to an embodiment.

Hereinafter, an embodiment of the present disclosure will be described in detail with reference to the drawings. In the drawings, the same or corresponding parts are denoted by the same reference signs and the description thereof will not be repeated.

A power system according to the present embodiment includes a plurality of vehicles. The vehicles in the power system may have different configurations, but have the same configuration in the present embodiment. Hereinafter, each of the vehicles in the power system will be referred to as "vehicle 50" unless otherwise distinguished. Each of a plurality of units of charging equipment in the power system will be referred to as "EVSE 40". EVSE stands for electric vehicle supply equipment.

FIG. 1 is a diagram showing a configuration of the vehicle according to the present embodiment. Referring to FIG. 1, the vehicle 50 is an electrified vehicle including a battery 130 that stores electric power for causing the vehicle 50 to travel. The battery 130 includes a secondary battery such as a lithium ion battery or a nickel metal hydride battery. In the present embodiment, an assembled battery including a plurality of lithium ion batteries is used as the secondary battery. The assembled battery is composed of a plurality of single cells (commonly also referred to as "cells") electrically connected to each other. Other power storage devices such as an electric double layer capacitor may be used instead of the secondary battery.

The vehicle 50 includes an electronic control unit (hereinafter referred to as "ECU") 150. The vehicle 50 is capable of power control. The power control includes power feeding to a power grid PG described later (external power feeding), and charging from the power grid PG (external charging). The ECU 150 executes charging control and discharging control of the battery 130. The ECU 150 controls communication with the outside of the vehicle 50. The vehicle 50 may be a battery electric vehicle (BEV) that can travel by using only the electric power stored in the battery 130. The vehicle 50 may be a plug-in hybrid electric vehicle (PHEV) that can travel by using both the electric power stored in the battery 130 and the power output from an engine (not shown). Hereinafter, the external power feeding and the external charging may be referred to collectively as "power control".

The vehicle 50 can charge the battery 130 by receiving electric power supplied from the EVSE 40. The vehicle 50 includes an inlet 110 and a charger-discharger 120 compatible with a power feeding system of the EVSE 40.

A cable 42 is connected to the EVSE 40. The EVSE 40 and the vehicle 50 are electrically connected by connecting a connector 43 of the cable 42 connected to the EVSE 40 to the inlet 110 of the vehicle 50. Thus, the electric power can be exchanged between the EVSE 40 and the vehicle 50 through the cable 42.

The charger-discharger 120 is located between the inlet 110 and the battery 130. The charger-discharger 120 includes a relay and a power conversion circuit (for example, a bidirectional converter) (neither shown). The relay switches connection and disconnection of an electric power path from the inlet 110 to the battery 130.

The ECU 150 includes a processor 151, a random access memory (RAM) 152, a storage device 153, and a timer 154. The processor 151 includes, for example, a central processing unit (CPU). The RAM 152 includes a working memory for temporarily storing data to be processed by the processor 151. The storage device 153 is configured to be able to save stored information. The storage device 153 stores, in addition to programs, information to be used in the programs (for example, maps, mathematical expressions, and various parameters). In the present embodiment, various types of control in the ECU 150 are executed by the processor 151 executing the programs stored in the storage device 153. The timer 154 notifies the processor 151 about arrival of a set time. At the time set in the timer 154, the timer 154 transmits, to the processor 151, a signal for notifying the processor 151 about the arrival of the set time.

The vehicle 50 further includes a travel drive unit 140, a communication device 160, and drive wheels W. The travel drive unit 140 includes a power control unit (PCU) and a motor generator (MG), neither shown. The travel drive unit 140 causes the vehicle 50 to travel by using the electric power stored in the battery 130.

The communication device 160 includes various communication interfaces (I/Fs). The ECU 150 performs wireless communication with communication devices outside the vehicle 50 through the communication device 160. The communication device 160 may be configured to be able to perform vehicle-to-vehicle communication.

In recent years, a system utilizing energy resources owned by consumers (hereinafter also referred to as "demand side resources (DSRs)") in a power system has been constructed. The DSRs function as distributed energy resources (hereinafter also referred to as "DERs").

A virtual power plant (VPP) has been proposed as the system utilizing the DSRs in the power system. In the VPP, electricity providers that provide energy management services by aggregating the DERs are referred to as "aggregators". An electric power company can adjust the supply and demand balance of electric power by demand response (hereinafter also referred to as "DR"), for example, in cooperation with the aggregator.

The DR is a method for adjusting the supply and demand balance of electric power by issuing a predetermined request to each consumer using a demand response signal (hereinafter also referred to as "DR signal"). The DR signal is roughly divided into two types that are a DR signal for requesting power demand reduction or reverse power flow (hereinafter also referred to as "downward DR signal") and a DR signal for requesting power demand increase (hereinafter also referred to as "upward DR signal").

Figure 2:
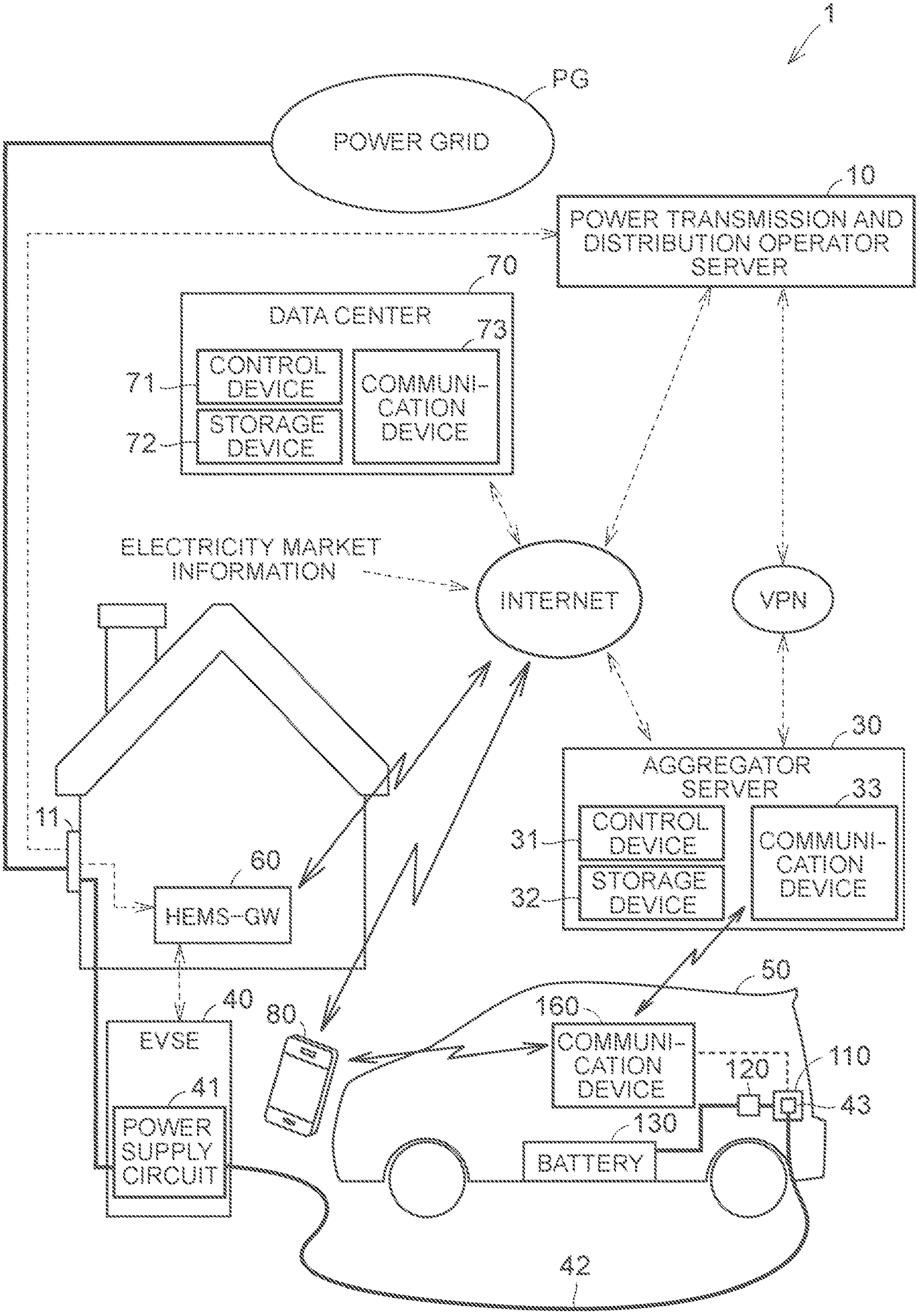
FIG. 2 is a diagram showing a configuration of a vehicle grid integration (VGI) system (power system) according to the embodiment.

FIG. 2 is a diagram showing a schematic configuration of the power system according to the present embodiment. A vehicle grid integration (VGI) system 1 shown in FIG. 2 is an example of the "power system" according to the present disclosure. FIG. 2 shows one vehicle, one unit of EVSE, and one aggregator server. The VGI system 1 may include a plurality of vehicles, a plurality of units of EVSE, and a plurality of aggregator servers. FIG. 2 illustrates home-use EVSE. The VGI system 1 may include public EVSE available to a large number of unspecified users.

Referring to FIG. 2, the VGI system 1 includes a power transmission and distribution operator server 10 (hereinafter also simply referred to as "server 10"), a smart meter 11, an aggregator server 30 (hereinafter also simply referred to as "server 30"), the EVSE 40, the vehicle 50, a home energy management system-gateway (HEMS-GW) 60, a data center 70, a mobile terminal 80, and the power grid PG. In the present embodiment, the mobile terminal 80 includes a smart phone or a tablet having a touch panel display.

The server 10 belongs to a power transmission and distribution operator. In the present embodiment, the electric power company serves both as a power generation operator and as a power transmission and distribution operator, and corresponds to a grid operator that operates the power grid PG.

Identification information for identifying each smart meter (hereinafter also referred to as "meter ID") is assigned to each smart meter. The server 10 manages the measured value of each smart meter by distinguishing it based on the meter ID.

In the VGI system 1, identification information (ID) for identifying each of the aggregators is assigned to each aggregator. The server 10 manages information of each aggregator by distinguishing it based on the ID of the aggregator. The aggregator provides the energy management service by aggregating electric energies controlled by consumers in a management area. The aggregator can control the electric energies by requesting power leveling from the consumers with the DR signals.

The server 30 belongs to the aggregator. The server 30 includes a control device 31, a storage device 32, and a communication device 33. The control device 31 includes a processor. The control device 31 performs predetermined information processing and controls the communication device 33. The storage device 32 can save various types of information. The communication device 33 includes various communication I/Fs. The control device 31 communicates with the outside through the communication device 33. The DSR managed by the aggregator (server 30) in the VGI system 1 is an electrified vehicle. The consumer controls the electric energy by using the electrified vehicle. Identification information for identifying each vehicle 50 included in the VGI system 1 (hereinafter also referred to as "vehicle ID") is assigned to each vehicle 50. The server 30 manages information of each vehicle 50 by distinguishing it based on the vehicle ID.

The data center 70 includes a control device 71, a storage device 72, and a communication device 73. The control device 71 includes a processor. The control device 71 performs predetermined information processing and controls the communication device 73. The storage device 72 can save various types of information. The communication device 73 includes various communication I/Fs. The control device 71 communicates with the outside through the communication device 73. Identification information for identifying each mobile terminal (hereinafter also referred to as "terminal ID") is assigned to each mobile terminal. The data center 70 manages information of each mobile terminal by distinguishing it based on the terminal ID. The terminal ID also functions as information for identifying a user (user ID).

The mobile terminal 80 exchanges information with the HEMS-GW 60 and the data center 70 through a predetermined application. For example, the mobile terminal 80 wirelessly communicates with the HEMS-GW 60 and the data center 70 via the Internet. The user can transmit information indicating the user's status and schedule to the data center 70 by operating the mobile terminal 80. Examples of the information indicating the user's status include information indicating whether the user can handle the DR. Examples of the information indicating the user's schedule include a departure time of a personal owned vehicle (POV) from home, and an operation plan for a Mobility-as-a-Service (MaaS) vehicle. The data center 70 saves the information received from the mobile terminal 80 by distinguishing it based on each terminal ID.

The server 10 and the server 30 can communicate with each other via, for example, a virtual private network (VPN). The servers 10 and 30 can acquire electricity market information (for example, information on electricity trading) via, for example, the Internet. The server 30 and the data center 70 can communicate with each other via, for example, the Internet. The server 30 can acquire information on users from the data center 70. The server 30 and the data center 70 can communicate with the HEMS-GW 60 via, for example, the Internet. In the present embodiment, the server 30 and the EVSE 40 do not communicate with each other. However, the server 30 and the EVSE 40 may communicate with each other.

The server 30 sequentially acquires and saves, from each vehicle 50 in the management area, information indicating the status of each vehicle 50 (for example, a vehicle position, a cable connection status, a battery status, a charging (power feeding) schedule, a charging (power feeding) condition, a traveling schedule, and a traveling condition). The cable connection status is information indicating whether the cable connector is connected to the inlet 110. The battery status is information indicating a value of a state of charge (SOC) of the battery 130 and indicating whether the battery 130 is being charged. The charging (power feeding) schedule is information indicating a start time and an end time of scheduled external charging (external power feeding). The charging (power feeding) condition may be a condition for scheduled external charging (external power feeding) (for example, charging power or feeding power), or a condition for current charging (power feeding) (for example, charging (feeding) power or the remaining charging (feeding) period). The traveling schedule is information indicating a start time and an end time of scheduled traveling. The traveling condition may be a condition for scheduled traveling (for example, a traveling route and a traveling distance), or a condition for current traveling (for example, a traveling speed and the remaining traveling distance).

The server 10 performs power leveling by using DR. When the server 10 performs the power leveling, the server 10 first transmits a signal for requesting participation in the DR (hereinafter also referred to as "DR participation request") to each aggregator server (including the server 30). The DR participation request includes a target area of the DR, a type of the DR (for example, downward DR or upward DR), and a DR period. When the server 30 receives the DR participation request from the server 10, the server 30 is configured to calculate a possible DR amount (that is, an electric energy that can be adjusted in accordance with the DR), and transmit it to the server 10. The server 30 can calculate the possible DR amount based on, for example, the total DR capacity (that is, a DR-handleable capacity) of consumers in the management area.

The server 10 determines a DR amount of each aggregator (that is, a power balancing amount to be requested from the aggregator) based on the possible DR amount received from each aggregator server. The server 10 transmits a signal for instructing each aggregator server (including the server 30) to execute the DR (hereinafter also referred to as "DR execution instruction"). The DR execution instruction includes the target area of the DR, the type of the DR (for example, downward DR or upward DR), the DR amount of the aggregator, and the DR period. When the server 30 receives the DR execution instruction, the server 30 allocates the DR amount to each vehicle 50 capable of handling the DR among the vehicles 50 in the management area. The server 30 creates a DR signal for each vehicle 50 and transmits the DR signal to each vehicle 50. The DR signal includes the type of the DR (for example, downward DR or upward DR), the DR amount of the vehicle 50, and the DR period.

The ECU 150 receives the DR signal from the outside of the vehicle through the communication device 160. When the ECU 150 receives the DR signal, the user of the vehicle 50 can contribute to the power leveling by charging or power feeding according to the DR signal using the EVSE 40 and the vehicle 50.

The vehicle 50 shown in FIG. 2 is electrically connected to the outdoor EVSE 40 via the cable 42 while being parked in a parking space in a residence (for example, a user's home). The vehicle 50 and the EVSE 40 can communicate with each other by connecting the connector 43 of the cable 42 connected to the EVSE 40 to the inlet 110 of the vehicle 50. Further, the power control (external charging and external power feeding) can be performed through a power supply circuit 41.

The power supply circuit 41 is connected, via the smart meter 11, to the power grid PG provided by the electric power company. The smart meter 11 is configured to measure the electric energy supplied from the EVSE 40 to the vehicle 50.

Figure 3:
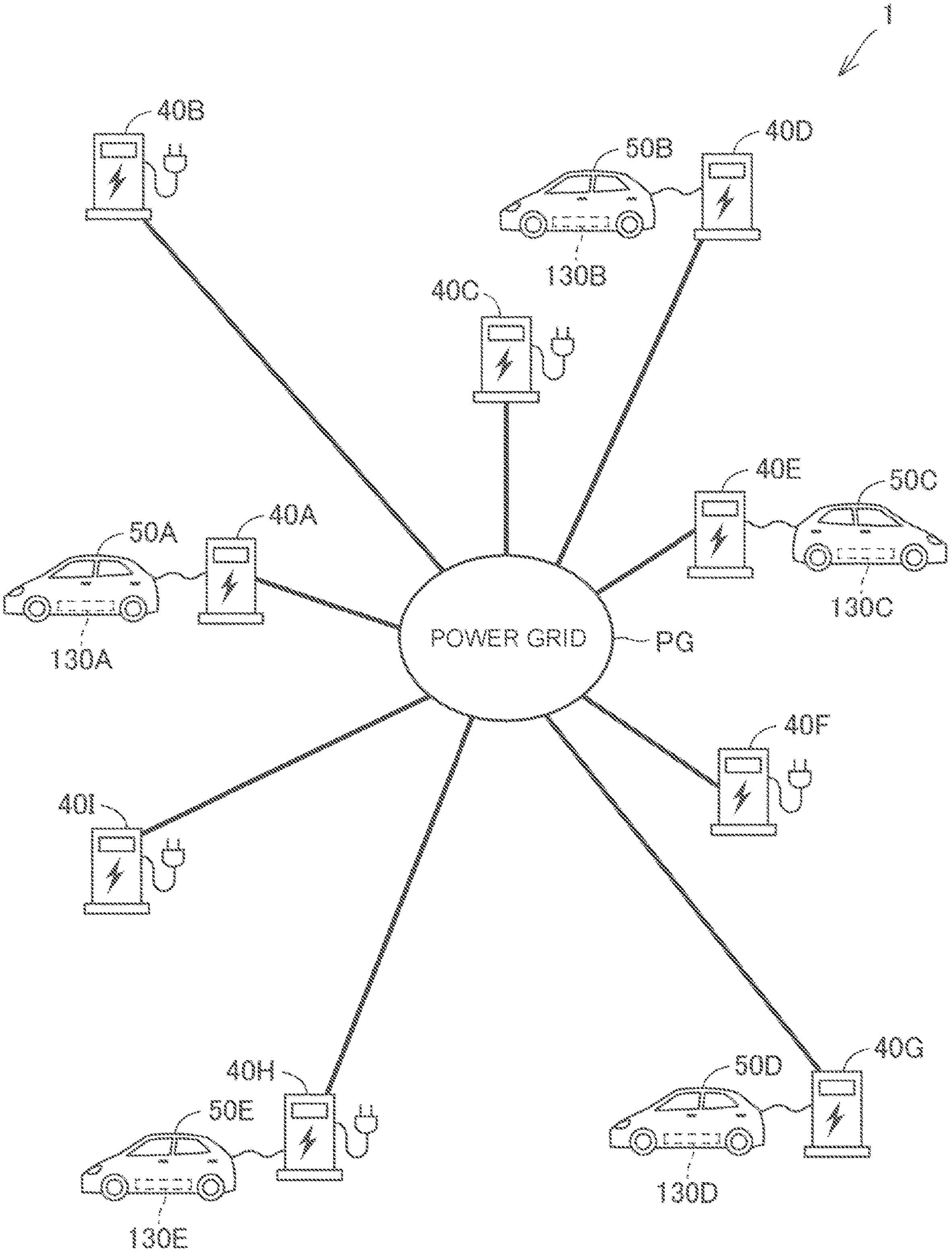
FIG. 3 is a diagram showing a plurality of vehicles and a plurality of units of electric vehicle supply equipment (EVSE) managed by the VGI system (power system) according to the embodiment.

FIG. 3 is a diagram showing an external power supply, a plurality of units of charging equipment, and a plurality of vehicles in the power system according to the present embodiment. As shown in FIG. 3, the VGI system 1 includes units of EVSE 40A to 401, vehicles 50A to 50E, and the power grid PG that supplies electric power to the units of EVSE 40A to 401. The vehicles 50A to 50E include batteries 130A to 130E, respectively. Each of the vehicles 50A to 50E is electrically connectable to the power grid PG via one of the units of EVSE 40A to 401. The power control of each of the vehicles 50A to 50E is controlled by the server 30.

The vehicle is generally set so that the power control (external charging or external power feeding) is performed at a scheduled time planned in advance during the DR period. When the power control of the vehicle is completed as scheduled, the power control of another vehicle is started. Therefore, the sum of the charging (feeding) powers of the vehicles is kept constant. However, the power control may be terminated unexpectedly before the scheduled time because the vehicle leaves during the power control or the battery is fully charged ahead of schedule. In this case, it is difficult to compensate for the influence on the sum of the electric powers with the power control of the other vehicle whose power control time is preset. Therefore, there is a demand to suppress the fluctuation in the sum of the charging (feeding) powers when a plurality of vehicles performs the power control.

Figure 4:
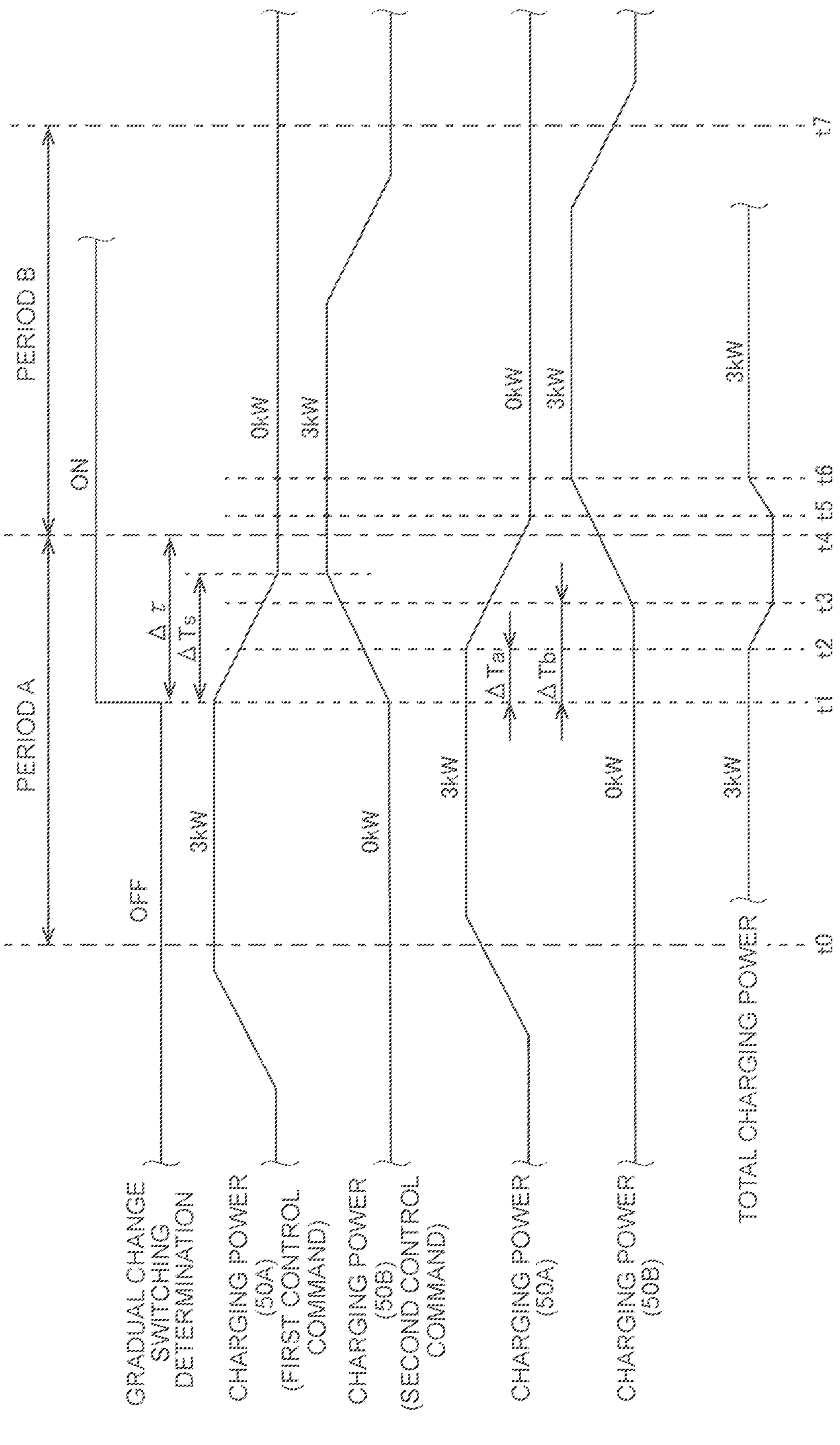
FIG. 4 is a diagram showing gradual change switching control of a server according to the embodiment.

In the present embodiment, the vehicle 50A is set to perform the external charging during a period A (times t0 to t4) (see FIG. 4). Each of the vehicles 50B and 50C is set to perform the external charging during a period B (times t4 to t7) after the period A (see FIG. 4). The period B comes subsequent to (immediately after) the period A. The period A and the period B may be included in the same DR period or in consecutive DR periods, respectively. The vehicle 50A is an example of a "first power device" of the present disclosure. The vehicles 50B and 50C are examples of a "second power device" of the present disclosure. The period A and the period B are examples of a "first period" and a "second period" of the present disclosure, respectively.

The number of vehicles 50 set to perform the external charging in the period B may be one, three, or more.

In the present embodiment, each of the vehicles 50D and 50E is set to perform the external charging when the vehicle 50A is withdrawn from the external charging during the external charging. In other words, each of the vehicles 50D and 50E is set to perform the external charging when the vehicle 50A is withdrawn from the external charging (completes the external charging) earlier than the timing planned in advance. Each of the vehicles 50D and 50E may be scheduled to perform the power control in a period later than the period A and the period B. In this case, each of the vehicles 50D and 50E is in a state in which the power control can be performed, before the scheduled power control in preparation for unexpected withdrawal of the vehicle 50A. The vehicles 50D and 50E are examples of a "third power device" of the present disclosure.

The number of vehicles 50 set to perform the external charging when the vehicle 50A is withdrawn from the external charging earlier than the timing planned in advance may be one, three, or more. In the present embodiment, description has been given of the example in which the vehicles (50B, 50C) that perform the external charging when the vehicle 50A is withdrawn from the external charging as scheduled (at a scheduled timing) are different from the vehicles (50D, 50E) that perform the external charging when the vehicle 50A is withdrawn from the external charging at a timing different from the scheduled timing. However, the present disclosure is not limited to this example. The vehicles (50B, 50C) that perform the external charging when the vehicle 50A is withdrawn from the external charging as scheduled may be set to perform the external charging when the withdrawal occurs at a timing different from the scheduled timing.

Figure 5:
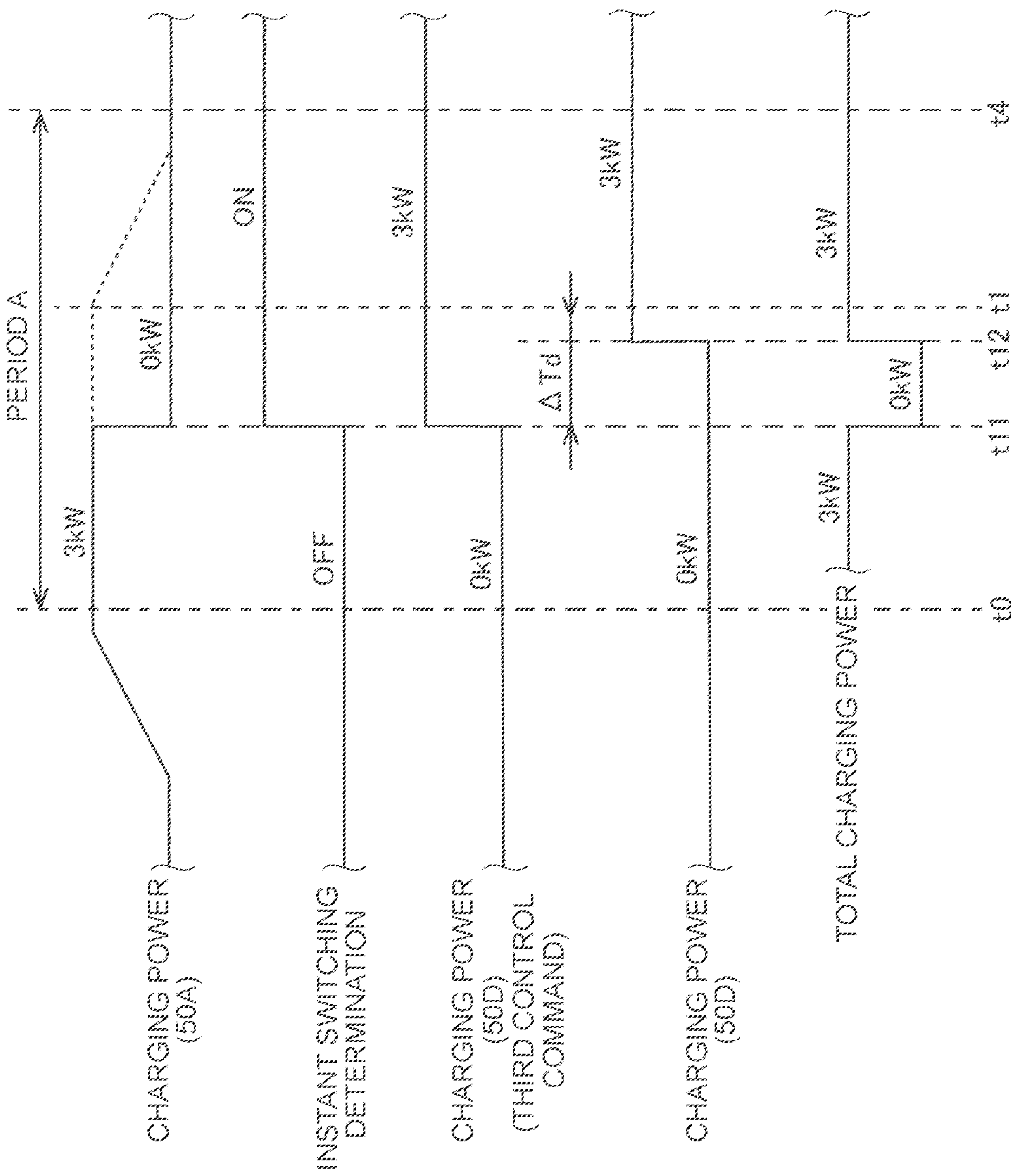
FIG. 5 is a diagram showing instant switching control in a period A by the server according to the embodiment.

In the present embodiment, as shown in FIG. 4, the server 30 (control device 31) performs gradual change switching control when switching the target of the external charging from the vehicle 50A to the vehicle 50B. In the gradual change switching control, the server 30 switches the target of the external charging by gradually changing both the charging amounts (charging powers) in the external charging of the vehicle 50A and the vehicle 50B. As shown in FIG. 5, the server 30 (control device 31) performs instant switching control when switching the target of the external charging from the vehicle 50A to the vehicle 50D. In the instant switching control, the server 30 switches the target of the external charging by instantly changing the charging amount (charging power) in the external charging of the vehicle 50D to an amount corresponding to the charging amount (charging power) in the external charging of the vehicle 50A.

The server 30 (control device 31) transmits, to the vehicle 50A, a first control command to control the charging power of the vehicle 50A. The server 30 also transmits, to the vehicle 50B, a second control command to control the charging power of the vehicle 50B. In the example shown in FIG. 4, when performing the gradual change switching control, the server 30 reduces the charging power of the vehicle 50A in the first control command at a constant rate from 3 kw to 0 kw over a predetermined period (for example, 10 minutes to 15 minutes). When performing the gradual change switching control, the server 30 increases the charging power of the vehicle 50B in the second control command at a constant rate from 0 kw to 3 kw over a predetermined period (for example, 10 minutes to 15 minutes). At the same timing (time t1 in FIG. 4), the server 30 starts to reduce the charging power in the first control command and increase the charging power in the second control command. In the gradual change switching control, the slope of the reduction in the charging power in the first control command and the slope of the increase in the charging power in the second control command are equal to each other in terms of the absolute values. The first and second control commands may be transmitted to the units of EVSE 40 connected to the vehicle 50A and the vehicle 50B, respectively. The time t1 is an example of a "predetermined time" of the present disclosure.

The server 30 (control device 31) transmits, to the vehicle 50D, a third control command to control the charging power of the vehicle 50D. In the example shown in FIG. 5, the vehicle 50A is suddenly withdrawn from the external charging (time t11). Therefore, the charging power of the vehicle 50A instantly decreases from 3 kw to 0 kw. When the communication device 33 (see FIG. 2) acquires information indicating that the charging power of the vehicle 50A has decreased (reached 0) before the scheduled time at which the external charging of the vehicle 50A is scheduled to finish, the server 30 (control device 31) determines that the vehicle 50A is unexpectedly withdrawn from the external charging. In this case, the server 30 performs the instant switching control by instantly (for example, within several seconds) increasing the charging power of the vehicle 50D in the third control command from 0 kw to 3 kw.

When the server 30 (control device 31) performs the instant switching control, the server 30 performs control for increasing an upper limit current value of the EVSE 40 compared to an upper limit current value during the gradual change switching control. Thus, the charging power can be increased sharply.

A predetermined communication delay period occurs between each of the vehicles 50A to 50E and the server 30. The communication delay period depends on the specifications of the communication device 160 mounted on each vehicle 50, the communication environment at the arrangement position of each EVSE 40, and the like. The server 30 acquires information on the communication delay period of each of the vehicles 50A to 50E. In the present embodiment, the information on the communication delay period includes the maximum communication delay period. When the vehicle 50 is connected to the EVSE 40, the server 30 (control device 31) may acquire (calculate) the maximum communication delay period based on information on the vehicle 50 and information on the EVSE 40 connected to the vehicle 50. The communication delay period between the vehicle 50A and the server 30 is an example of a "first communication delay period" of the present disclosure. The communication delay period between the vehicle 50B or the vehicle 50C and the server 30 is an example of a "second communication delay period" of the present disclosure. The communication delay period between the vehicle 50D or the vehicle 50E and the server 30 is an example of a "third communication delay period" of the present disclosure.

As shown in FIG. 6, in the present embodiment, each of the maximum communication delay period of the vehicle 50A (ΔTa in FIG. 4) and the maximum communication delay period of the vehicle 50D (ΔTd in FIG. 5) is 0.5 minutes. Each of the maximum communication delay period of the vehicle 50B (ΔTb in FIG. 4) and the maximum communication delay period of the vehicle 50E is 1 minute. The maximum communication delay period of the vehicle 50C is 1.5 minutes.

In the present embodiment, the server 30 (control device 31) performs the gradual change switching control based on the maximum communication delay period of the vehicle 50A and the maximum communication delay periods of the vehicles 50B and 50C. Specifically, the server 30 performs the gradual change switching control based on a magnitude relationship between a difference between the maximum communication delay period of the vehicle 50A and the maximum communication delay period of the vehicle 50B and a difference between the maximum communication delay period of the vehicle 50A and the maximum communication delay period of the vehicle 50C.

The difference between the maximum communication delay period of the vehicle 50A and the maximum communication delay period of the vehicle 50B (1 minute−0.5 minutes=0.5 minutes) is smaller than the difference between the maximum communication delay period of the vehicle 50A and the maximum communication delay period of the vehicle 50C (1.5 minutes−0.5 minutes=1 minute). Therefore, the server 30 (control device 31) selects the vehicle 50B as the target of the gradual change switching control. If the difference between the maximum communication delay period of the vehicle 50A and the maximum communication delay period of the vehicle 50C is smaller than the difference between the maximum communication delay period of the vehicle 50A and the maximum communication delay period of the vehicle 50B, the server 30 selects the vehicle 50C as the target of the gradual change switching control. The server 30 performs the gradual change switching control based on a magnitude relationship between the absolute values of the differences.

As shown in FIG. 4, the sum of the charging power of the vehicle 50A and the charging power of the vehicle 50B (total charging power) decreases between a time t2 and a time t3 due to the magnitude of the difference between the maximum communication delay period of the vehicle 50A and the maximum communication delay period of the vehicle 50B (ΔTb−ΔTa). Therefore, the amount of decrease in the total charging power can be reduced as the difference (ΔTb−ΔTa) decreases.

The amount of decrease in the charging power of the vehicle 50A and the amount of increase in the charging power of the vehicle 50B are equal to each other between the time t3 and the time t4. Therefore, the total charging power does not change and remains constant at a predetermined value. The total charging power that has decreased between the time t2 and the time t3 increases to 3 kw between a time t5 and a time t6 after the charging power of the vehicle 50A stops decreasing. The total charging power is kept at 3 kw at the time t6 onward after the charging power of the vehicle 50B stops increasing.

The server 30 (control device 31) performs the instant switching control based on the maximum communication delay periods of the vehicles 50D and 50E. Specifically, the server 30 performs the instant switching control based on a magnitude relationship between the maximum communication delay period of the vehicle 50D and the maximum communication delay period of the vehicle 50E.

The maximum communication delay period of the vehicle 50D (0.5 minutes) is shorter than the maximum communication delay period of the vehicle 50E (1 minute). Therefore, the server 30 (control device 31) selects the vehicle 50D as the target of the instant switching control. If the maximum communication delay period of the vehicle 50E is shorter than the maximum communication delay period of the vehicle 50D, the server 30 selects the vehicle 50E as the target of the instant switching control.

As shown in FIG. 5, the sum of the charging power of the vehicle 50A and the charging power of the vehicle 50D (total charging power) decreases from the time t11 to a time t12 due to the magnitude of the maximum communication delay period of the vehicle 50D (ΔTd). Therefore, the period in which the total charging power decreases can be reduced as the maximum communication delay period of the vehicle 50D (ΔTd) decreases. The total charging power that has decreased at the time t11 instantly increases to 3 kw at the time t12 along with the increase in the charging power of the vehicle 50D. The total charging power is kept at 3 kw at the time t12 onward after the instant increase in the charging power of the vehicle 50D is completed.

In the present embodiment, as shown in FIG. 4, the server 30 (control device 31) determines to perform the gradual change switching control when the external charging of the vehicle 50A is being performed until the time t1. Specifically, the server 30 changes gradual change switching determination (signal) from OFF to ON when the vehicle 50A is not withdrawn from the external charging until the time t1. By changing the gradual change switching determination (signal) from OFF to ON, the server 30 determines that the target of the power control (external charging) can be switched from the vehicle 50A to the vehicle 50B or the vehicle 50C by the gradual change switching control.

In the present embodiment, as shown in FIG. 5, the server 30 determines to perform the instant switching control when the vehicle 50A is withdrawn from the external charging before the time t1. Specifically, the server 30 (control device 31) changes instant switching determination (signal) from OFF to ON when the vehicle 50A is withdrawn from the external charging before the time t1. By changing the instant switching determination (signal) from OFF to ON, the server 30 determines that the target of the power control (external charging) can be switched from the vehicle 50A to the vehicle 50D or the vehicle 50E by the instant switching control.

The time t1 is earlier by a period Δτ (see FIG. 4) than the time t4 that is the scheduled end time of the period A. The period Δτ is equal to or longer than a longer one (ΔTb) of the maximum communication delay period of the vehicle 50A (ΔTa) and the maximum communication delay period of the vehicle 50B (ΔTb). The period Δτ is preferably equal to or longer than the longest period among ΔTa, ΔTb, and the maximum communication delay period of the vehicle 50C. The period Δτ is an example of a "predetermined period" of the present disclosure.

The period Δτ is, for example, about 30 minutes. That is, in the present embodiment, the period Δτ is 10 times or more the longest period among ΔTa, ΔTb, and the maximum communication delay period of the vehicle 50C. The magnitude of the period Δτ is not limited to the above example.

The slope of the reduction in the charging power of the vehicle 50A and the slope of the increase in the charging power of the vehicle 50B during the gradual change switching control shown in FIG. 4 are preset fixed values. The fixed value is preset so that a period ΔTs during which the charging power is changed is equal to or longer than the longer one (ΔTb) of the maximum communication delay period of the vehicle 50A (ΔTa) and the maximum communication delay period of the vehicle 50B (ΔTb). The fixed value is preferably preset so that the period ΔTs is equal to or longer than the longest period among ΔTa, ΔTb, and the maximum communication delay period of the vehicle 50C. Thus, the timings at which the charging power is changed can securely overlap each other between the vehicles 50 that are the targets of the gradual change switching control (vehicles 50A and 50B in FIG. 4). The period ΔTs is, for example, about 10 minutes to 15 minutes.

The slope of the charging power of the vehicle 50A (50B) during the gradual change switching control may be set based on a delay period due to a control response. The delay period due to the control response means a period from the timing when the vehicle 50 receives a charging power control signal to the timing when the charging power is changed based on the received control signal.

Power Control Method

Figure 7:
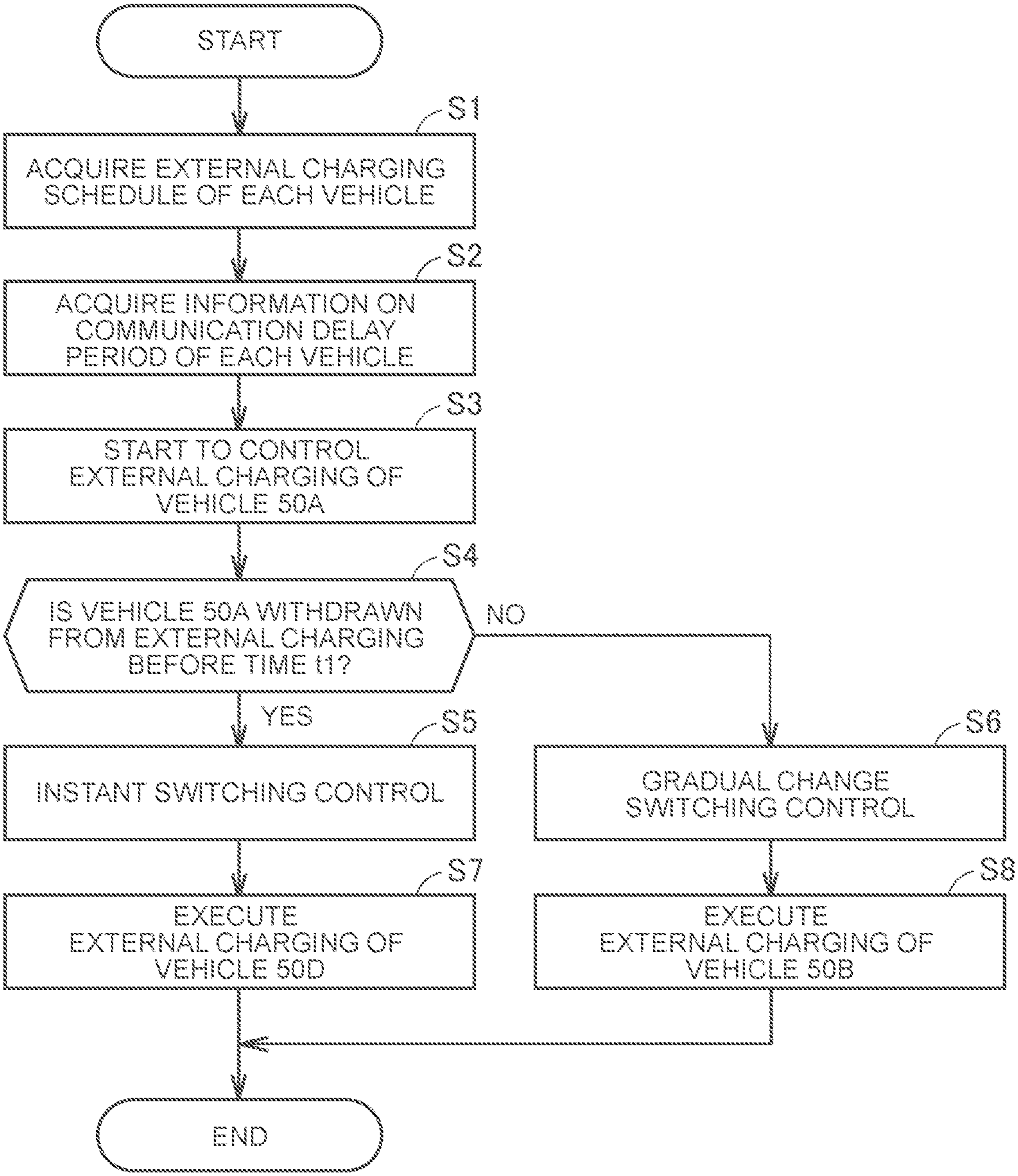
FIG. 7 is a flowchart showing a power control method during external charging by the server according to the embodiment.

Next, a power control method to be performed by the server 30 (control device 31) of the present embodiment will be described with reference to FIG. 7. FIG. 7 shows a flow from a timing when the server 30 receives the DR execution instruction (external charging request) from the server 10 to a timing when the target of the external charging is switched from the vehicle 50A to the next vehicle 50.

In Step S1, the server 30 first acquires an external charging schedule of each of the vehicles 50A to 50E. The schedule may be acquired from each vehicle 50 or set by the server 30 based on, for example, the traveling schedule of each vehicle 50.

In Step S2, the server 30 then acquires information on the communication delay period (maximum communication delay period) between the server 30 and each of the vehicles 50A to 50E. The server 30 may calculate the magnitude of the maximum communication delay period based on the specifications of the communication device 160 of each of the vehicles 50A to 50E, the communication environment at the position of the EVSE 40 connected to each of the vehicles 50A to 50E, and the like.

In Step S3, the server 30 then starts to control the external charging of the vehicle 50A. Specifically, the server 30 starts to control the external charging in the period A (see FIG. 4) based on the schedule acquired in Step S1.

In Step S4, the server 30 then determines whether the vehicle 50A is withdrawn from the external charging before the time t1. The communication device 33 acquires, by communication, information on whether the vehicle 50A is withdrawn from the external charging before the time t1. When determination is made that the vehicle 50A is withdrawn from the external charging before the time t1 ("Yes" in S4), the process proceeds to Step S5. When determination is made that the vehicle 50A is not withdrawn from the external charging before the time t1 ("No" in S4), the process proceeds to Step S6.

In Step S5, the server 30 switches the target of the external charging from the vehicle 50A to the vehicle 50D or the vehicle 50E by the instant switching control. The instant switching control is performed at the timing when the vehicle 50A is withdrawn from the external charging. As described above, the server 30 selects the vehicle 50D having the shortest maximum communication delay period as the target of the external charging out of the vehicles 50D and 50E. Step S5 is an example of an "instant switching step" of the present disclosure.

In Step S6, the server 30 switches the target of the external charging from the vehicle 50A to the vehicle 50B or the vehicle 50C by the gradual change switching control. The gradual change switching control is started at the time t1. As described above, the server 30 selects the vehicle 50B corresponding to the maximum communication delay period that minimizes the difference from the maximum communication delay period of the vehicle 50A as the target of the external charging out of the vehicles 50B and 50C. Step S6 is an example of a "gradual change switching step" of the present disclosure.

In Step S7, the server 30 executes (continues) the external charging of the vehicle 50D selected in Step S5.

In Step S8, the server 30 executes (continues) the external charging of the vehicle 50B selected in Step S6.

As described above, in the present embodiment, the server 30 (control device 31) performs the gradual change switching control. In the gradual change switching control, the server 30 switches the target of the power control by gradually changing both the charging amounts (charging powers) in the external charging of the vehicle 50A and the vehicle 50B. The server 30 also performs the instant switching control. In the instant switching control, the server 30 switches the target of the external charging by instantly changing the charging amount (charging power) in the external charging of the vehicle 50D to an amount corresponding to the charging amount (charging power) in the external charging of the vehicle 50A.

Through the instant switching control, it is possible to promptly suppress the fluctuation in the total charging power caused by the unexpected withdrawal of the vehicle 50A from the external charging by instantly increasing the charging power of the vehicle 50D. Through the gradual change switching control, it is possible to suppress the abrupt fluctuation in the total charging power even when there is a difference between the maximum communication delay period of the vehicle 50A and the maximum communication delay period of the vehicle 50D.

Figure 8:
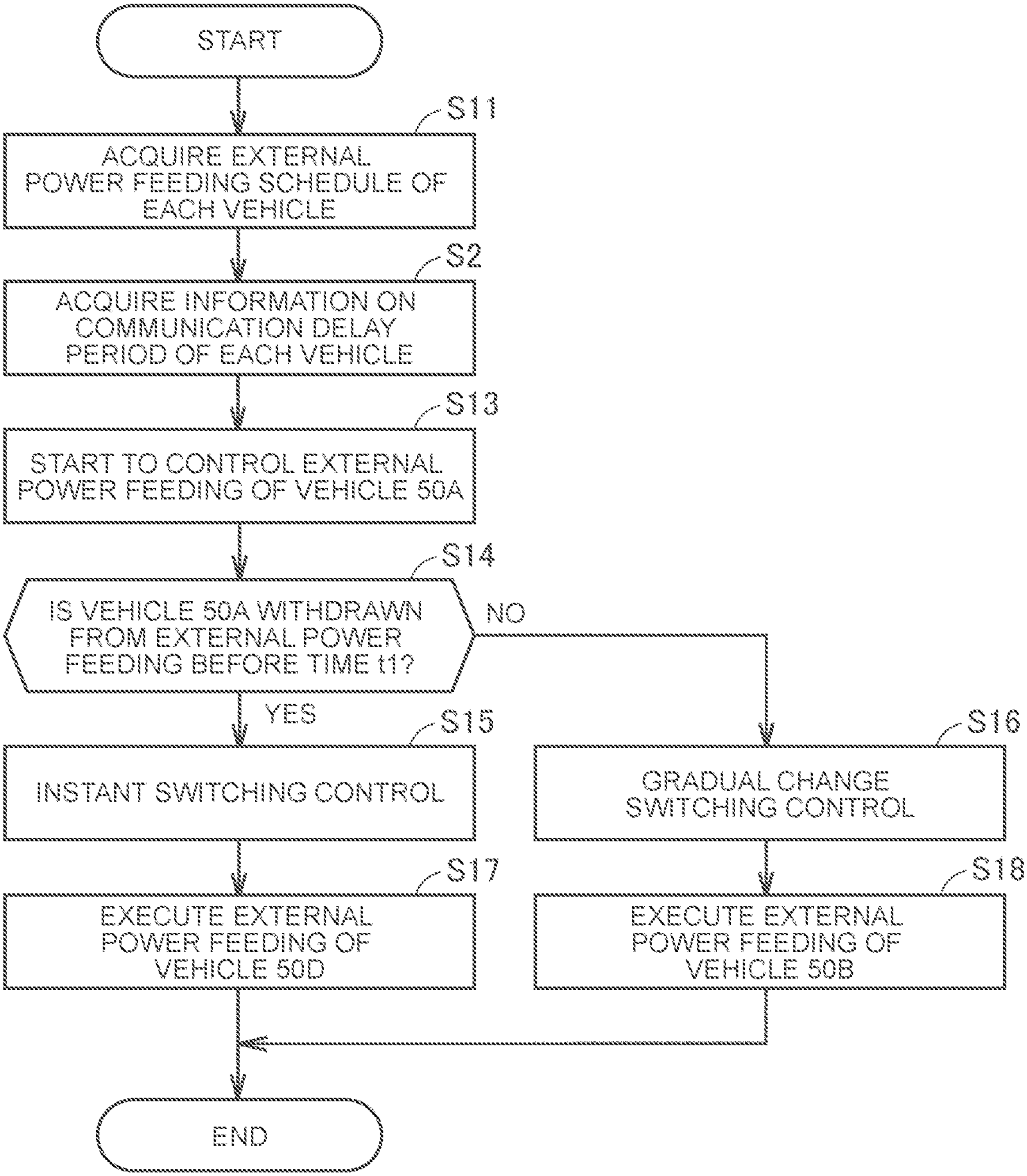
FIG. 8 is a flowchart showing a power control method during external power feeding by the server according to a modification of the embodiment.

In the above embodiment, the control for switching the vehicle 50 serving as the target of the external charging has been described, but the present disclosure is not limited to this control. As shown in FIG. 8, the gradual change switching control and the instant switching control in the above embodiment may be performed even in a case of switching the vehicle 50 serving as the target of the external power feeding. In the example shown in FIG. 8, Steps S11 and S13 to S18 are performed in place of Steps S1 and S3 to S8 in FIG. 7, respectively. In the control in Steps S11 and S13 to S18, the items related to the external charging in the control in Steps S1 and S3 to S8 are replaced with those related to the external power feeding. Therefore, detailed description will not be given.

Figure 9:
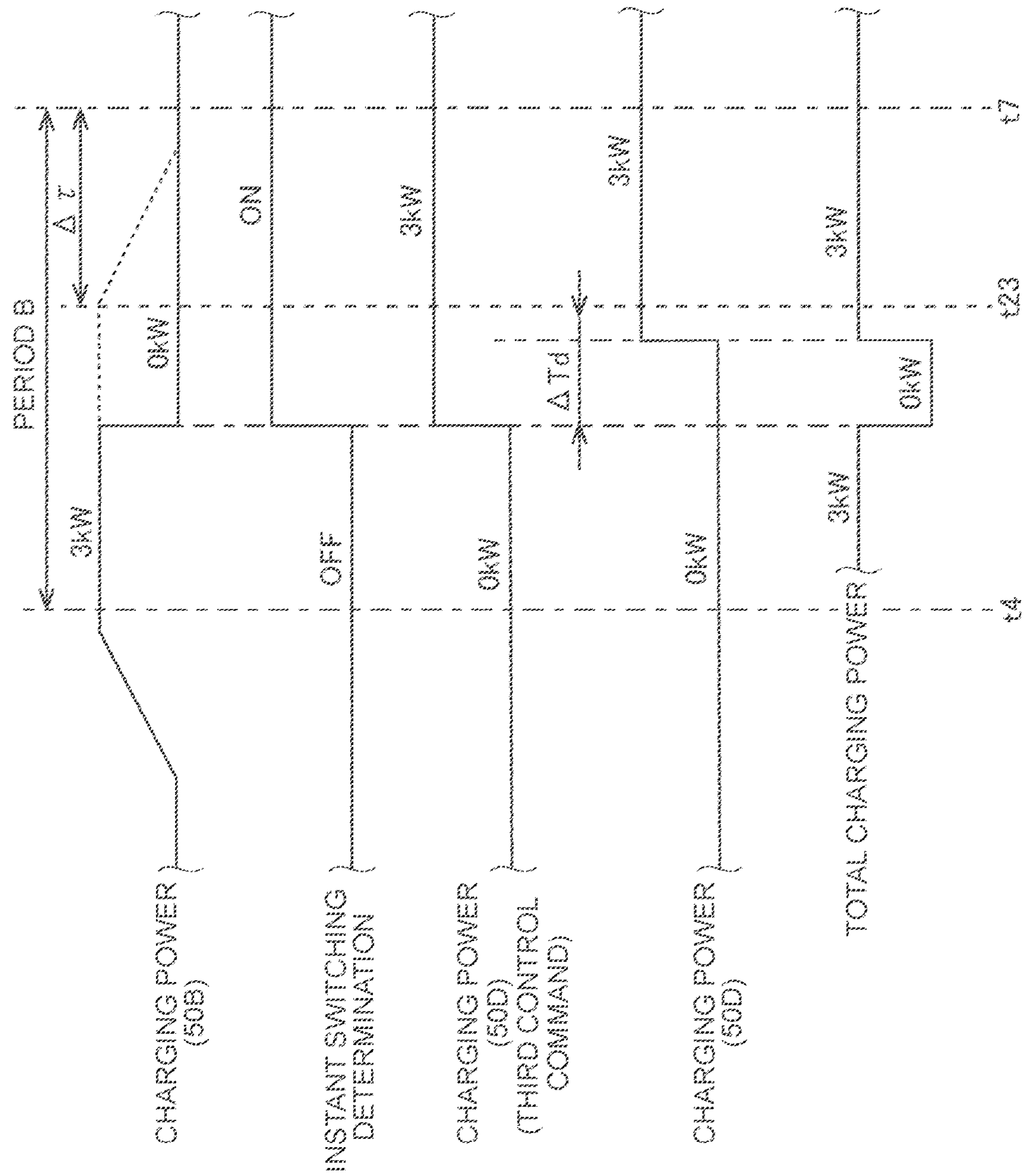
FIG. 9 is a diagram showing instant switching control in a period B by the server according to a modification of the embodiment.

In the above embodiment, description has been given of the example in which the instant switching control is performed when the vehicle 50A is unexpectedly (unplannedly) withdrawn from the power control (external charging). However, the present disclosure is not limited to this example. As shown in FIG. 9, the instant switching control may be performed also when the vehicle 50B is unexpectedly withdrawn from the power control (external charging).

In the example shown in FIG. 9, the server 30 (control device 31) determines to perform the instant switching control when the vehicle 50B is withdrawn from the external charging before a time t23 in the period B. The time t23 is earlier by the period $\Delta\tau$ than the time t7 that is the scheduled end time of the period B. Details of the instant switching control are the same as those in the above embodiment, and therefore detailed description will not be repeated.

Only the instant switching control in the period A or the instant switching control in the period B may be performed.

In the above embodiment, description has been given of the example in which the target of the power control is switched between the vehicles. However, the present disclosure is not limited to this example. In addition to the vehicles, the control for switching the target of the power control may be performed between power devices other than the vehicles (for example, power storage devices, air conditioners, and water heaters).

Figure 10:
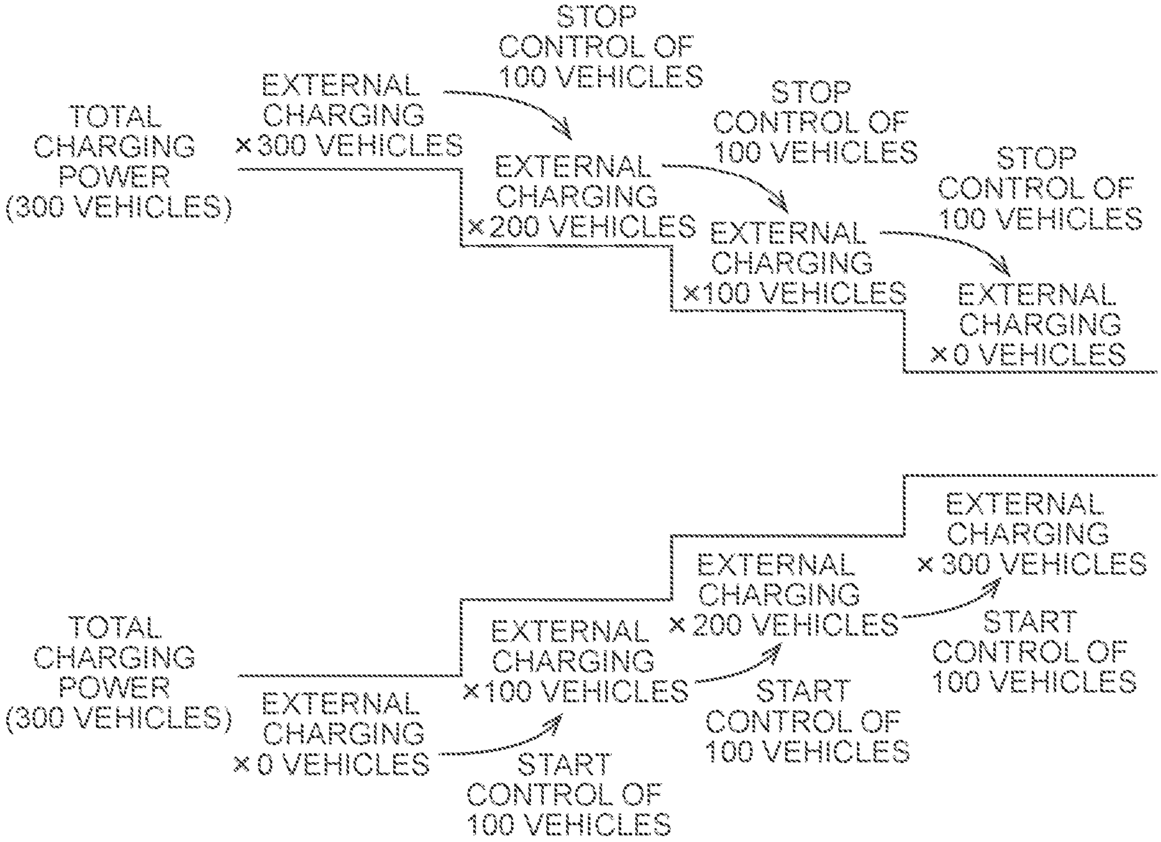
FIG. 10 is a diagram showing an example in which the gradual change switching control is performed between groups each including a plurality of vehicles.

In the above embodiment, description has been given of the example in which the charging power is gradually changed for each vehicle 50 during the gradual change switching control. However, the present disclosure is not limited to this example. For example, the total charging power of a plurality of vehicles 50 may gradually be changed. In an example shown in FIG. 10, the gradual change switching control is performed between different groups each including 300 vehicles 50 by stopping (starting) the external charging of every 100 vehicles 50 in a stepwise manner.

In the above embodiment, description has been given of the example in which the server 30 (control device 31) determines that the unexpected withdrawal has occurred based on the charging power of the vehicle 50A acquired by the communication device 33. However, the present disclosure is not limited to this example. For example, the communication device 33 may be notified from the vehicle 50A (or the EVSE 40) that the unexpected withdrawal has occurred.

The configurations described in the above embodiment and the above various modifications may be combined as desired.

The embodiment disclosed herein should be considered to be illustrative and not restrictive in all respects. The scope of the present disclosure is shown by the claims rather than by the above description of the embodiment, and is intended to include all modifications within the meaning and scope equivalent to the claims.

What is claimed is:

1. A power system comprising:

a first power device configured to be set to perform power control including at least one of power feeding to a power grid and charging from the power grid during a first period;

at least one second power device configured to be set to perform the power control during a second period after the first period;

at least one third power device configured to be set to perform the power control when at least one of the first power device and the at least one second power device is withdrawn from the power control during the power control; and a power control device configured to:

control the power control of the first power device, the power control of the at least one second power device, and the power control of the at least one third power device;

perform gradual change switching control when the power control device switches a target of the power control from the first power device to the at least one second power device, the gradual change switching control being control for switching the target of the power control by gradually changing both charging amounts or power feeding amounts in the power control of the first power device and charging amounts or power feeding amounts in the power control of the at least one second power device; and perform instant switching control when the power control device switches the target of the power control from at least one of the first power device and the at least one second power device to the at least one third power device, the instant switching control being control for switching the target of the power control by instantly changing a charging amount or a power feeding amount in the power control of the at least one third power device to an amount corresponding to at least one of the charging amount or the power feeding amount in the power control of the first power device and the charging amount or the power feeding amount in the power control of the at least one second power device, wherein the power control device is configured to:

communicate with the first power device;

communicate with the at least one second power device;

communicate with the at least one third power device;

acquire information on a first communication delay period in communication between the first power device and the power control device;

acquire information on a second communication delay period in communication between the at least one second power device and the power control device;

acquire information on a third communication delay period in communication between the at least one third power device and the power control device;

perform the gradual change switching control based on the first communication delay period and the second communication delay period; and perform the instant switching control based on the third communication delay period, wherein the power system further comprises:

a plurality of the at least one second power device; and a plurality of the at least one third power device, wherein the power control device is configured to:

select, from among the second power devices, a second power device including a smallest difference between the second communication delay period and the first communication delay period as a target of the gradual change switching control; and select, from among the third power devices, a third power device including the shortest third communication delay period as a target of the instant switching control.

2. The power system according to claim 1, wherein:

the first period includes a predetermined time earlier by a predetermined period than a scheduled end time of the first period; and the power control device is configured to:

determine to perform the gradual change switching control when the power control of the first power device is being performed until the predetermined time; and determine to perform the instant switching control when the first power device is withdrawn from the power control before the predetermined time.

3. The power system according to claim 2, wherein:

the predetermined period has a length equal to or larger than a length of a longer one of the first communication delay period and the second communication delay period.

4. The power system according to claim 1, wherein the first power device includes an electrified vehicle.

5. The power system according to claim 1, wherein the at least one second power device includes an electrified vehicle.

6. A power control device comprising a processor configured to:

perform power control of a first power device, the power control including at least one of power feeding to a power grid and charging from the power grid, the first power device being configured to be set to perform the power control during a first period;

perform the power control of a second power device, the second power device being configured to be set to perform the power control during a second period after the first period;

perform the power control of a third power device, the third power device being configured to be set to perform the power control when at least one of the first power device and the second power device is withdrawn from the power control during the power control;

perform gradual change switching control when the processor switches a target of the power control from the first power device to the second power device, the gradual change switching control being control for switching the target of the power control by gradually changing both charging amounts or power feeding amounts in the power control of the first power device and charging amounts or power feeding amounts in the power control of the second power device; and perform instant switching control when the processor switches the target of the power control from at least one of the first power device and the second power device to the third power device, the instant switching control being control for switching the target of the power control, by instantly changing a charging amount or a power feeding amount in the power control of the third power device to an amount corresponding to at least one of the charging amount or the power feeding amount in the power control of the first power device and the charging amount or the power feeding amount in the power control of the second power device, wherein the processor is configured to:

communicate with the first power device;

communicate with the second power device;

communicate with the third power device;

acquire information on a first communication delay period in communication between the first power device and the processor;

acquire information on a second communication delay period in communication between the second power device and the processor;

acquire information on a third communication delay period in communication between the third power device and the processor;

perform the gradual change switching control based on the first communication delay period and the second communication delay period; and perform the instant switching control based on the third communication delay period, wherein the second power device is one of a plurality of second power devices, and the third power device is one of a plurality of third power devices, and wherein the processor is configured to control the plurality of second power devices and the plurality of third power devices, and wherein the processor is configured to:

select, from among the second power devices, a second power device including a smallest difference between the second communication delay period and the first communication delay period as a target of the gradual change switching control; and select, from among the third power devices, a third power device including the shortest third communication delay period as a target of the instant switching control.

7. A power control method comprising:

performing power control of a first power device, the power control including at least one of power feeding to a power grid and charging from the power grid, the first power device being configured to be set to perform the power control during a first period;

performing the power control of a second power device, the second power device being configured to be set to perform the power control during a second period after the first period;

performing the power control of a third power device, the third power device being configured to be set to perform the power control when at least one of the first power device and the second power device is withdrawn from the power control during the power control;

switching a target of the power control from the first power device to the second power device by gradually changing both charging amounts or power feeding amounts in the power control of the first power device and charging amounts or power feeding amounts in the power control of the second power device; and switching the target of the power control from at least one of the first power device and the second power device to the third power device, by instantly changing a charging amount or a power feeding amount in the power control of the third power device to an amount corresponding to at least one of the charging amount or the power feeding amount in the power control of the first power device and the charging amount or the power feeding amount in the power control of the second power device, wherein the power control method further comprises:

communicating with the first power device;

communicating with the second power device;

communicating with the third power device;

acquiring information on a first communication delay period in communication with the first power device;

acquiring information on a second communication delay period in communication with the second power device;

acquiring information on a third communication delay period in communication with the third power device;

performing the gradual change switching control based on the first communication delay period and the second communication delay period; and performing the instant switching control based on the third communication delay period, wherein the power control method controls a plurality of the second power devices and a plurality of the third power devices, and wherein the power control method further comprises:

selecting, from among the second power devices, a second power device including a smallest difference between the second communication delay period and the first communication delay period as a target of the gradual change switching control; and selecting, from among the third power devices, a third power device including the shortest third communication delay period as a target of the instant switching control.

* * * * *